United States Patent [19]

Ittycheriah et al.

[11] Patent Number: 5,924,070
[45] Date of Patent: Jul. 13, 1999

[54] CORPORATE VOICE DIALING WITH SHARED DIRECTORIES

[75] Inventors: Abraham Poovakunnel Ittycheriah; Stephane Herman Maes, both of Danbury, Conn.

[73] Assignee: International Business Machines Corporation, Armonk, N.Y.

[21] Appl. No.: 08/870,373

[22] Filed: Jun. 6, 1997

[51] Int. Cl.$^6$ .................................................. H04M 1/00
[52] U.S. Cl. ........................................ 704/275; 379/88.03
[58] Field of Search .............................. 379/88.01, 88.02, 379/88.03, 88.11, 88.13, 354, 355; 704/231, 246, 251, 270, 272, 275

[56] References Cited

U.S. PATENT DOCUMENTS

| | | |
|---|---|---|
| 4,363,102 | 12/1982 | Holmgren et al. . |
| 4,449,189 | 5/1984 | Feix et al. . |
| 4,450,545 | 5/1984 | Kishi et al. . |
| 4,506,377 | 3/1985 | Kishi et al. . |
| 4,506,378 | 3/1985 | Noso et al. . |
| 4,528,687 | 7/1985 | Noso et al. . |
| 4,558,459 | 12/1985 | Noso et al. . |
| 4,644,107 | 2/1987 | Clowes et al. ......................... 379/354 |
| 4,720,863 | 1/1988 | Li et al. . |
| 4,725,956 | 2/1988 | Jenkins . |
| 4,797,924 | 1/1989 | Schnars et al. . |
| 4,827,518 | 5/1989 | Feustel et al. . |
| 4,827,520 | 5/1989 | Zeinstra . |
| 4,853,953 | 8/1989 | Fujisaki ...................................... 379/88 |
| 4,862,363 | 8/1989 | Krisher et al. . |
| 5,073,939 | 12/1991 | Vensko et al. . |
| 5,086,385 | 2/1992 | Launey et al. . |
| 5,091,947 | 2/1992 | Ariyoshi et al. . |
| 5,121,428 | 6/1992 | Uchiyama et al. . |
| 5,142,565 | 8/1992 | Ruddle . |
| 5,165,095 | 11/1992 | Borcherding ......................... 379/88.03 |
| 5,167,004 | 11/1992 | Netsch et al. . |
| 5,189,727 | 2/1993 | Guerreri . |
| 5,214,707 | 5/1993 | Fujimoto et al. . |
| 5,216,720 | 6/1993 | Naik et al. . |
| 5,241,649 | 8/1993 | Niyada . |

(List continued on next page.)

FOREIGN PATENT DOCUMENTS

| | | |
|---|---|---|
| 0 307 137 A2 | of 0000 | European Pat. Off. . |
| 0 567 135 A1 | of 0000 | European Pat. Off. . |
| 61-30855 | 2/1986 | Japan . |

OTHER PUBLICATIONS

Herbert Gish, Robust Discrimination In Automatic Speaker Identification, BBN Systems and Technologies Corporation, pp. 289–292.

Naik, Netsch and Doddington, Speaker Verification Over Long Distance Telephone Lines, Texas Instruments Inc., pp. 524–527.

Rosenberg, Lee, and Soone, Sub–Word Unit Talker Verification Using Hidden Markov Models, 1990, AT&T Bell Laboratories, pp. 269–272.

*Primary Examiner*—Scott Weaver
*Attorney, Agent, or Firm*—Whitham, Curtis & Whitham; Paul J. Otterstedt

[57] ABSTRACT

Voice-controlled customized commands including customization of the command to be preformed, such as a number to be dialed to make a connection with an address of a corporate voice dialing system, and the speech pattern or utterance which may be enrolled by a user to invoke the command can be used by other users, if authorized by the enrolling user. When a current user wants to use a customized command enrolled by another user, a preferably voice actuated command is invoked to cause the search of a database containing a page of customized commands for each user and the return of commands to which access of a current user is authorized in accordance with aliases established by the enrolling user. The returned commands are preferably presented to the current user as a menu from which the current user can make a selection and obtain execution of the authorized command.

18 Claims, 2 Drawing Sheets

U.S. PATENT DOCUMENTS

| | | |
|---|---|---|
| 5,271,088 | 12/1993 | Bahler . |
| 5,274,695 | 12/1993 | Green . |
| 5,297,183 | 3/1994 | Bareis et al. . |
| 5,339,385 | 8/1994 | Higgins . |
| 5,369,685 | 11/1994 | Kero . |
| 5,384,833 | 1/1995 | Cameron . |
| 5,412,738 | 5/1995 | Brunelli et al. . |
| 5,414,755 | 5/1995 | Bahler et al. ........................ 379/88.02 |
| 5,426,415 | 6/1995 | Parchar et al. . |
| 5,426,745 | 6/1995 | Baji et al. . |
| 5,450,525 | 9/1995 | Russell et al. . |
| 5,487,087 | 1/1996 | McCree et al. . |
| 5,526,465 | 6/1996 | Carey et al. . |
| 5,719,921 | 2/1998 | Vysotsky et al. ........................ 379/88 | ns
CORPORATE VOICE DIALING WITH SHARED DIRECTORIES

BACKGROUND OF THE INVENTION

1. Field of the Invention

The present invention generally relates to speech and speaker recognition and, more particularly, to the sharing of customized command libraries provided for recognizable speakers such as for voice activated control of connections or other functions made by a telephone system or other network.

2. Description of the Prior Art

Many electronic devices require input from a user in order to convey to the device particular information required to determine or perform a desired function or, in a trivially simple case, when a desired function is to be performed as would be indicated by, for example, activation of an on/off switch. When multiple different inputs are possible, a keyboard comprising an array of two or more switches has been the input device of choice in recent years.

However, keyboards of any type have inherent disadvantages. Most evidently, keyboards include a plurality of distributed actuable areas, each generally including moving parts subject to wear and damage and which must be sized to be actuated by a portion of the body unless a stylus or other separate mechanical expedient is employed. Accordingly, in many types of devices, such as input panels for security systems and electronic calculators, the size of the device is often determined by the dimensions of the keypad rather than the electronic contents of the housing. Additionally, numerous keystrokes may be required (e.g. to specify an operation, enter a security code, personal identification number (PIN), etc.) which slows operation and increases the possibility that erroneous actuation may occur. Therefore, use of a keyboard or other manually manipulated input structure requires action which is not optimally natural or expeditious for the user.

In an effort to provide a more naturally usable, convenient and rapid interface and to increase the capabilities thereof, numerous approaches to voice or sound detection and recognition systems have been proposed and implemented with some degree of success. Additionally, such systems could theoretically have the capability of matching utterances of a user against utterances of enrolled speakers for granting or denying access to resources of the device or system or calling customized command libraries in accordance with speaker identity in a manner which may be relatively transparent and convenient to the user.

Among such applications (although not admitted to be prior art as to the present invention) are so-called corporate voice dialing systems by which any person in a relatively large group of users of a telephone system or other network could use a voice command to specify a connection to be made. In such an application, of course, it would be impractical to provide recognition or discrimination of entries of even a relatively small phone book since any user is very unlikely to ever seek a connection with more than a minuscule proportion of the entries therein as well as the fact that many entries will be under the same or similar names which can only be discriminated by address. (Of course, speech recognition could be provided for directory assistance using voice recognition to guide the system through a hierarchical search in any system.) Additionally, sharing of lists would provide simplification of updating and maintaining consistency of entries which may otherwise appear on a plurality of lists. Further, it is natural for a user of such a system to use pseudonyms in a command in such a system and, generally, there will be a substantial commonality of the pseudonyms used (e.g. "call my wife", "call my supervisor", "call Bob", "call home", etc.) among users which may simplify the speech recognition process.

Therefore, it is convenient to establish a customized directory of recognizable commands for each user. Each user can enroll a list of these commands together with the actions to be taken (e.g. entry of the number to be dialed) when the command is uttered and modify the list from time to time thereafter. Speaker recognition can be used to fetch the appropriate list even for multiple users of the same terminal.

However, a user may also wish to use the list of another user to place a call or issue a command. Such a facility would allow the minimization of individual directories and storage requirements for the same while allowing a user to make a connection without necessarily knowing the identity of the party to be called (e.g. another user's home or supervisor in an emergency or to convey a message). Similarly, if a user wishes to place a call to a party which the user knows to be frequently called by another user, switching to the other user's list would provide the information without the need to personally contact the other user. Pooling of lists may be very useful within a supervisory hierarchy or in organizations such as a sales group particularly for propagation of updated information.

On the other hand, it is also desirable that each user have control over the entries in a customized command library that could be accessed by another user and system access controls must be maintained to prevent one user from calling a command authorized only for another user. It is also possible that a user may wish to allow a command to be accessed by some additional users but not other users of the system.

Accordingly, it is seen that there is a need to provide publishable entries at the will of any user and selectively provide for the switching of directories between users within the capabilities of a speech recognition system.

SUMMARY OF THE INVENTION

It is therefore an object of the present invention to provide a method and apparatus for switching between individual customized command directories available to users of a voice controlled system.

It is another object of the invention to provide for user control over the entries which can be shared and the other users which are allowed access to them.

It is a further object of the invention to provide an interface to a voice responsive system which supports the use of customized commands corresponding to a user by another user of the system.

In order to accomplish these and other objects of the invention, a method of operating a computer system including a speech recognition arrangement and providing for customization of some commands by each of a plurality of users is provided including the steps of identifying a current user, determining customized commands of another user to which a current user is permitted access, selecting a command from among the authorized customized commands, and executing the selected command in response to the selecting step.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
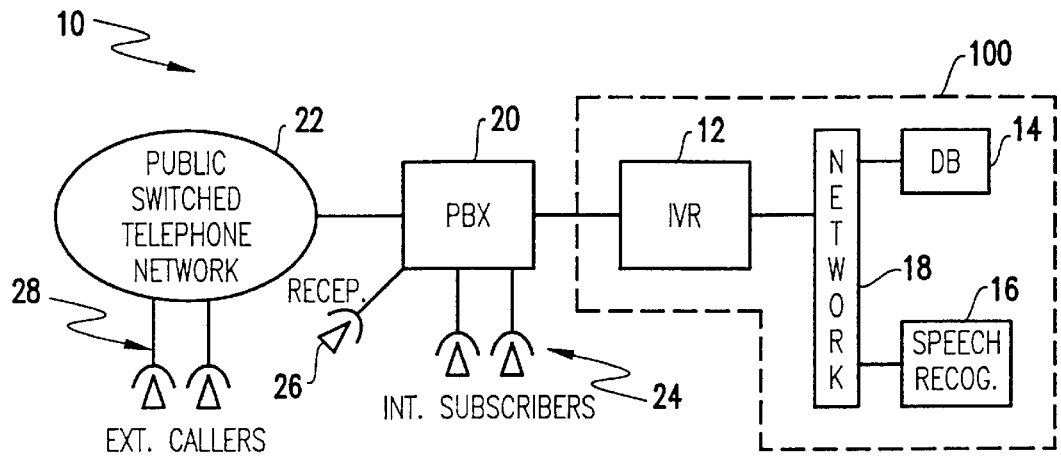
FIG. 1 is a high-level block diagram illustrative of a voice dialing architecture in accordance with the invention.

Referring now to the drawings, and more particularly to FIG. 1, an exemplary architecture 10 for a corporate voice dialing system is shown. It should be understood that the present invention, while being described in terms of a voice responsive dialing system, is applicable to any system which provides for customized libraries of commands for individual users.

The main components of the system architecture are an integrated voice response system (IVR) 12 to handle call interactions with users, a database 14 to hold user lists of enrolled names and numbers and a speech recognition system 16. Both the database 12 and the voice recognition system 16 are connected to the IVR 12 through a network 18, the details of which are unimportant to the successful practice of the invention. By the same token, any database capable of handling the flags and fields as will be discussed below and any speech recognition system can be used to practice the invention. However, it is much preferred that the speech recognition system also have the capability of speaker identification as well as of speech recognition (110 and 120 of FIG. 2, respectively) for ease of use and transparency to the user(s).

The remainder of the system architecture illustrated in FIG. 1 is not critical to the practice of the invention and conventional private branch exchange (PBX) 20 and public switched telephone network 22 arrangements can be used to allow inputs from internal subscribers 24 and other internal connections (e.g. receptionist 26), to route outgoing calls to external callers 28 and handle incoming calls in the normal manner (which may include external access to the voice dialing system of the invention, if desired).

Figure 2:
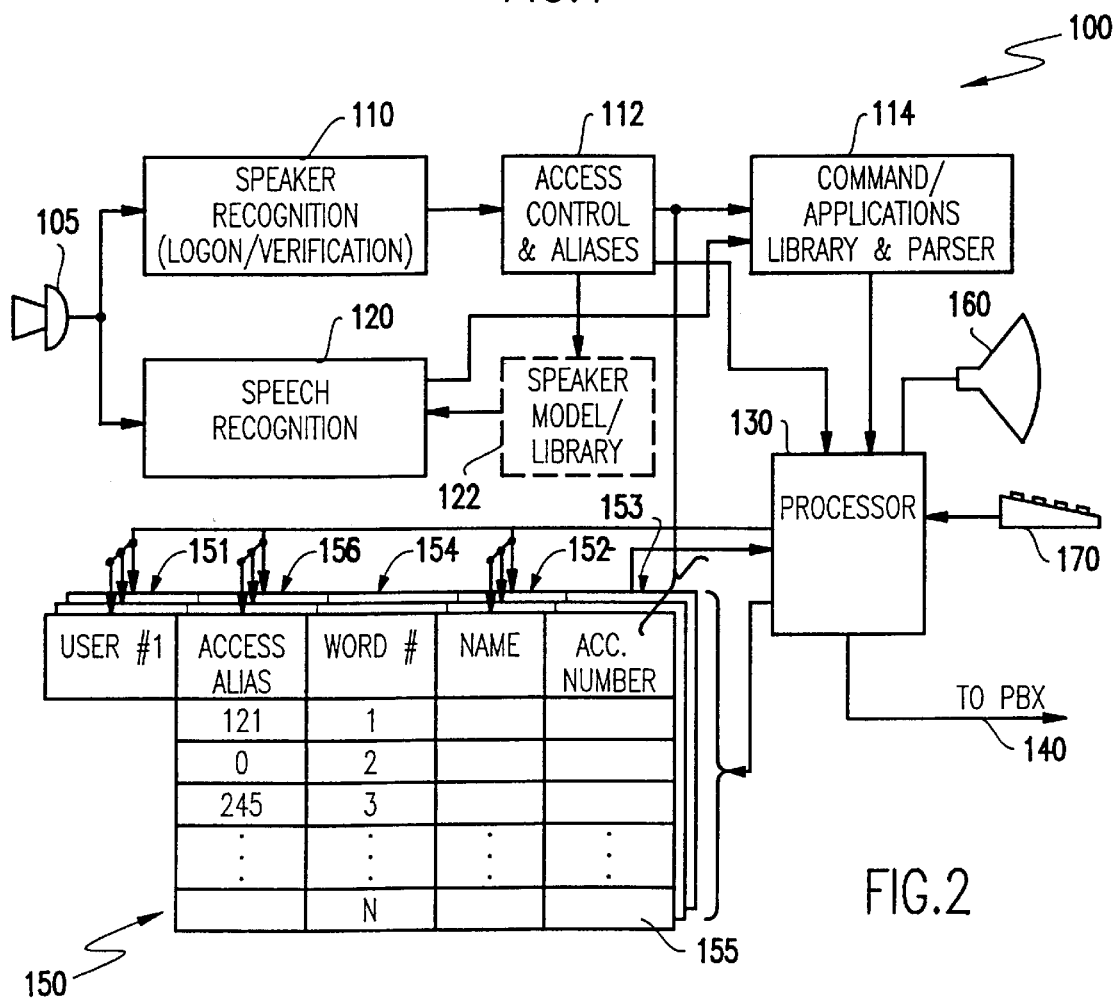
FIG. 2 illustrates a processor architecture and database for supporting publishable commands and its operation in accordance with the invention.

Referring now to FIG. 2, the portion 100 of the system architecture surrounded by a dashed line in FIG. 1 is shown in greater detail. Voice input (e.g. from PBX 20) is depicted symbolically by microphone 105. It should be understood that only the portions of the architecture relevant to practice of the preferred form of the invention are included in FIG. 2 and the elements depicted are arranged to facilitate an understanding of the principles of the invention. For example, only the access control 112, commands/applications storage 114 and processor 130 are shown which would be included in (or otherwise made available to) an IVR 12 suitable to the practice of the invention. Network 18 of FIG. 1 is not shown in FIG. 2. voice input is depicted as a direct input to the speech recognition system 120 and speaker recognition arrangement 110 since these would be implemented in the IVR 12 even though algorithms and storage necessary thereto may be implemented through data transfer through the network.

It should also be understood that, while no portion of FIG. 2 is admitted to be prior art as to the present invention, that at the high level of abstraction of the depiction of FIG. 2, some of the elements depicted will be provided in a conventional voice dialing system which does not possess the capabilities of the present invention because the depicted elements, as they would exist in a conventional system, do not possess the individual capabilities of the corresponding elements of the present invention which interact to provide the meritorious effects of the invention. By the same token, the invention can be readily retrofit into existing voice dialing systems by the addition, in combination, of the additional capabilities to the various depicted elements as will be described below.

In a conventional system, of course, speaker recognition 110 may not be provided and a conventional logon procedure, possibly using a password, may be used to establish user identity as security requirements of the system may dictate. Based on user identity, access control 112 would grant access to a library of customized commands which, for a voice dialing system would (but, in a more generalized system, need not) be telephone operating procedures such as call, redial, directory assistance, enroll, and the like to be called by unique voice commands, stored at 114. The voice commands are decoded at speech recognizer 120, possibly with the assistance of a speaker model trained on each enrolled speaker and stored in speaker model library 122. The speaker model would be called and transferred to the speech recognizer 120 in accordance with user identity, however that identity is determined.

Thus the combination of user identity (from access control 112) and a command (from speech recognizer 120) to command library 114 is sufficient to select and access any command available to the user, depending on the user's access authorization. It should be noted that such commands can access complex procedures and applications not limited to voice dialing and access authorizations in regard to each enrolled user and are generally desirable and preferably provided.

The customized command thus selected and output by command and applications library 114 is input to processor 130, as shown, which so recognizes it and (if a voice dialing command) reissues the command to the private branch exchange (PBX 20 of FIG. 1) in a form it can accept to perform the operation (e.g. dialing) specified. It should be also noted in regard to enrollment of customized commands that it is irrelevant to the operation of a voice dialing system whether the recognized utterance of a user is stored to control selection at command library 114 or if arbitrary utterances are decoded as more-or-less standard commands (e.g. so that the speaker may use non-standard phraseology such as an idiomatic phrase like "ring" or "dial up" rather than "call") at speech recognizer 120 to be transmitted as such to command library 114, or a combination thereof. However, in the former case, non-standard or customized utterances should be reflected in the speaker model library 122 to provide customized decoding of non-standard utterances for users which may adopt them.

In the present invention, it is much preferred to provide speaker recognition, particularly to provide periodic verification of user identity in a manner transparent to the user. Specifically, once a speaker/user has been identified for logon and access authorization, subsequently issued voice commands can also be used to screen subsequent decodable utterances to determine (to any desired level of confidence) that the speaker of the subsequent utterance is or is likely to be the same user previously identified. If not, further access is immediately denied or access authorization is altered.

Once a speaker/user is identified, access is provided at 112 to authorized commands in command library 114. The commands which are accessible to any particular user may be customized, as in the conventional voice dialing system. However, in accordance with the invention, at least one further command to switch directories (e.g. "SWITCH_TO <name>") which may also be customized to the user as to both the utterance to invoke it and the manner of execution (such as a default alternative directory to be called) is provided.

Further, additional authorization information, generally referred to as aliases, is also provided by access control 112, preferably directly to processor 130, as illustrated. Aliases, in general, may be no more than specific access authorizations to data or commands in addition to the direct access authorizations specific to any user. However, aliases can also be used as a tool for indirect addressing, sometimes referred to as redirection, and provide the capability of grouping files or even other aliases to which access may be granted under a single access authorization and granting use of that alias or a plurality of aliases to various groups of users in accordance with the security policy of the system (need-to-know, clearance level, etc.). While an alias generally has a unique alphanumeric/coded identifier, in a simple implementation of the invention, an alias could be implemented as a single flag bit for enrolled commands which distinguishes whether or not access is desired to be limited to the enrolling user (the user that enrolled the command) or may be shared among all users of the system.

In accordance with the invention, the command and application library also includes a parser to associate the currently identified user identity with a command, such as the command to change directories, as an argument of the command. Alternatively, though more complex, if aliases which the user is authorized to access are provided to the command and application library rather than the processor 130, as illustrated, the aliases can be substituted for the user identity or additionally included.

While the numbers to be called in response to an enrolled command would generally, as a matter of convenience, be stored as part of the command in command library 114 in a conventional system, it is considered preferable to establish a database 150 for the purpose. However, it is to be understood that database 150 could be considered as a part of command library 114 although, in such a case, library 114 would require its own autonomous processor or be operated by processor 130 in the same manner as will be described below. Therefore, the articulation of the system illustrated has been chosen for clarity of explanation of the invention rather than as being indicative of an organizational preference.

For a conventional function of voice dialing or the calling of other types of customized commands by an identified user in accordance with the system of the invention, the command, as decoded by speech recognizer 120 (which may be any type of fast match, language model, speaker model or detailed match process or combination or sequence thereof) and user identification are transmitted from the command library 114 to processor 130. This command invokes an access to database 150 by user name and command (e.g. a command to "call" and an enrolled name of a person to be called). The database 150, as is well-understood in the art, contains a "page" or directory (the latter used herein in the sense of either a directory of customized commands and/or the sense in which a directory may exist in a storage hierarchy of a computer system) for each user, which may be implemented in accordance with a user label 151.

The page or directory contains a plurality of enrolled entries depicted as individual lines of the page including names (or recognizable, enrolled, custom commands) in fields 152 and corresponding access numbers or other command-related information in fields 153 to return to processor 130 to be associated with the command in order to carry out the command. Word number field 154 is preferably provided for internal maintenance of the database to identify any entry and record information in regard thereto (e.g. entry date, last update, last access, and the like). It should be appreciated that by this preferred expedient of building the command with data retrieved from database 150, the command can be executed in a more general fashion and with substantial savings in memory requirements than in conventional voice dialing systems.

Figure 3:
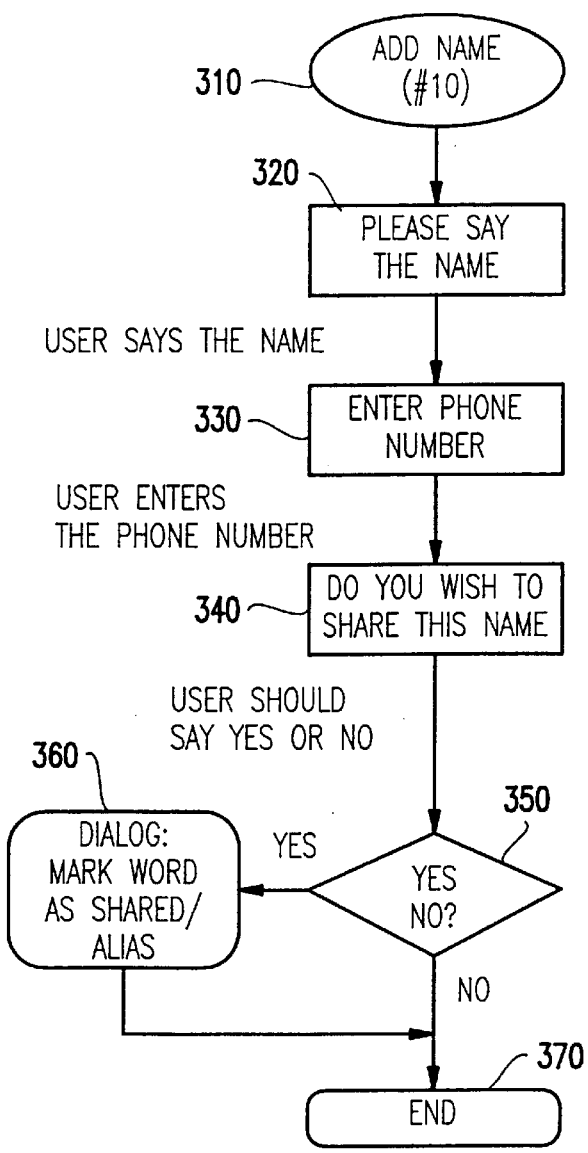
FIGS. 3 and 4 are flow charts illustrating a name training process and directory switching in accordance with the invention.

Referring now to FIG. 3 in addition to FIG. 2, an enrollment process in accordance with the invention is illustrated in flow chart form. It is assumed that the user has already been identified and access to a group of commands including an enroll (e.g. "ADDNAME") command (depicted at 310) which may preferably be recognized as a voice command for each user. (It should be understood, however, that other input devices, including a keyboard 170 could be used for any part or the entirety of the enrollment process.)

The enrollment procedure may also be used to update a previously enrolled command by entering a name or the number of a previous entry (e.g. #10) corresponding to field 154 by voice, keyboard, or other input device such as a cursor usable with a menu presented to the user on display 160. Such a menu can be simply derived in a manner well-understood in the art by display of the user's "page" in database 150. In the latter case, it may be preferable to use a distinct command for invoking the updating process unless the user prefers to review the enrolled commands to determine whether the information represents an update or a new enrollment. Such a determination could, of course, be automatically made based on a spoken name (e.g. ADDNAME <name>) being recognized as or confused with a name already enrolled.

Once the enrollment procedure is invoked, the user is prompted by an annunciator such as a voice synthesizer or by a display to say the name to be recognized as indicated at 320 and a representation thereof (possibly entered by keyboard) entered in field 152. Several repetitions of the name may be desirable to accommodate so-called intra-speaker variations in the speech. This speech information is added, in a manner not critical to the practice of the invention but, conveniently, by formation of a template, to speaker model library 122. In response, processor 130 provides a new line (e.g. 155) in the user's page of the database 150 or selects an existing line for updating.

The user is then prompted to enter data for field 153, as depicted at 330, by either keyboard or voice or other input device. If by voice, the opportunity for confirmation should be provided by suitable prompting of the user by annunciator or display 160. At this point, the entry is essentially complete but for the user's control over sharing of the information, as will now be discussed.

In order to establish this criterion in accordance with the invention, the user is asked (again, by prompting through an annunciator or display 160) whether the information is to be shared. If the response is "no", an appropriate entry or flag is entered in field 156 (e.g. a null or zero value or flag) on line 155 and the enrollment process is complete. If "yes", the user may be prompted with a dialog box or menu of names and/or classes of users, one or more of which may be selected an a corresponding entry or entries made in field 156 to complete the enrollment process. Only a single alias is shown since a single alias may be used to specify a plurality of other aliases in a nested or hierarchical fashion as alluded to above but, in principle, plural users and/or aliases could be stored.

Figure 4:
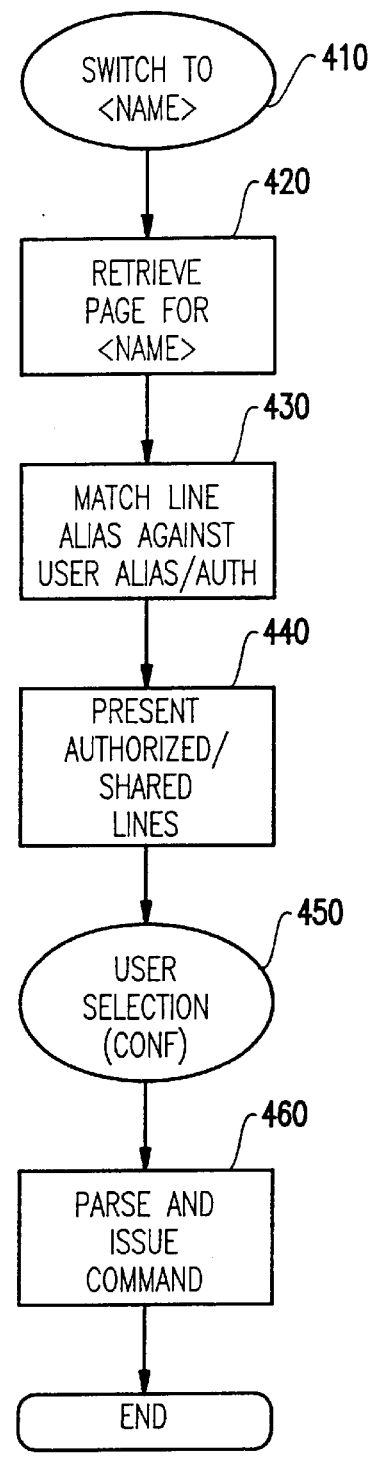

At any given state of enrollment, the system in accordance with the invention may be used as described above by a user. If, however, a user wishes to use the enrolled list of another user, a "SWITCH_TO <name>" command (the name and/or syntax of the command being arbitrary) can be uttered or otherwise entered to start the process illustrated in FIG. 4 as indicated at 410. In response, processor 130 accesses database 130 to retrieve the page for the user <name>(as distinct from the currently identified user) in accordance with field 151, as illustrated at 420. Field 156 containing alias information for each line can then be sorted by processor 130, as illustrated at 430, against the alias(es) or access authorizations of the currently identified user and unauthorized sharing of individual lines of the page thus suppressed. Alternatively, or as a default for entry or recognition of the input "<name>", pages of the database can be scanned for entries including alias information for which access is authorized and only authorized lines returned to processor 130.

The resulting list of shared enrolled names for which sharing with the currently identified user has been authorized are then presented to the user, preferably as a menu on display 160 since no template for the name in the currently recognized user's voice will generally be available in speaker model library (but could be collected during such use as a perfecting feature of the present invention in much the same manner as enrollment) and speech recognition of the name may be marginal. Such a menu provides a suitable selection medium for selection (or confirmation to enable adding a voice command template to speaker model library 122) as depicted at 450. A menu is also desirable since a user may not be certain of the phraseology used by an enrolling user to refer to or call an enrolled entry or may wish to import an entry (e.g. an updated entry) from another user's directory into the current user's directory by a suitable further command, as will be evident to those skilled in the art in view of the above discussion.

In view of the foregoing, it is seen that the invention provides for sharing of directories for voice dialing or any other customized commands as part of a voice responsive system and which provides for limitation of access by system users under full control of an enrolling user. The invention further provides flexibility of use and expediting of the propagation of updated information as well as limitation of storage requirements for the overall system.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of operating a computer system including speech and speaker recognition arrangements and providing for customization of some commands by each of a plurality of users, said method including the steps of
   identifying a current user issuing a current command with said speaker recognition arrangement,
   determining ones of said customized commands of another user to which said current user is permitted access,
   selecting a command by said current user from among said customized commands of said another user determined by said determining step, and
   executing said command in response to said selecting step.

2. A method as recited in claim 1, wherein said identifying step includes the step of
   executing a logon procedure for said current user.

3. A method as recited in claim 1, wherein said computer system further includes a speaker recognition arrangement and wherein said identifying step includes the step of
   recognizing text of speech of a current user.

4. A method as recited in claim 3, including the further step of
   verifying a current speaker of a command as a current user of said computer system.

5. A method as recited in claim 1, including the further step of
   recognizing and executing a customized command enrolled by said current user.

6. A method as recited in claim 5, wherein said recognizing and executing step is performed in response to a voice command.

7. A method as recited in claim 1, including the further step of
   recognizing and executing a command to retrieve customized commands enrolled by another user to which said current user is permitted access.

8. A method as recited in claim 7, wherein said recognizing and executing step is performed in response to a voice command.

9. A method as recited in claim 7, including the further step of
   presenting to said current user customized commands of other users to which said current user is permitted access.

10. A method as recited in claim 9, wherein said presenting step includes the further step of
    displaying a menu of said customized commands, said method including the further step of
    selecting a customized command from said menu.

11. A method as recited in claim 7, including the further step of
    presenting to said current user customized commands of said another user to which said current user is permitted access.

12. A method as recited in claim 11, wherein said presenting step includes the further step of
    displaying a menu of said customized commands, said method including the further step of
    selecting a customized command from said menu.

13. A method as recited in claim 1, wherein said customized commands include
    a command to make a connection to a selected address of a telephone system.

14. A method as recited in claim 1, including the further step of
    enrolling a command by an enrolling user,
    customizing said command enrolled by said enrolling step to form a said customized command, and
    storing said customized command to be retrieved in accordance with an identity of said enrolling user.

15. A method as recited in claim 14, including the further step of
    updating a command enrolled by said enrolling user by changing said customizing of said command.

16. A method as recited in claim 1, wherein said determining step comprises the steps of assigning an alias to a said customized command, granting an alias to each user of said computer system, and comparing said alias of a user to an alias of said customized command.

17. A method as recited in claim 14, wherein said determining step comprises the steps of assigning an alias to a said customized command during said enrollment step, granting an alias to each user of said computer system, and comparing said alias of a user to an alias of said customized command.

18. A method as recited in claim 17, wherein said alias is a flag indicating whether or not a customized command can be shared with another user.

* * * * *